US011494623B2

(12) United States Patent
Cho et al.

(10) Patent No.: US 11,494,623 B2
(45) Date of Patent: Nov. 8, 2022

(54) PROCESSING ELEMENT AND OPERATING METHOD THEREOF IN NEURAL NETWORK

(71) Applicant: ELECTRONICS AND TELECOMMUNICATIONS RESEARCH INSTITUTE, Daejeon (KR)

(72) Inventors: Yong Cheol Peter Cho, Daejeon (KR); Young-Su Kwon, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 978 days.

(21) Appl. No.: 16/206,687

(22) Filed: Nov. 30, 2018

(65) Prior Publication Data

US 2019/0244084 A1 Aug. 8, 2019

(30) Foreign Application Priority Data

Dec. 1, 2017 (KR) .......................... 10-2017-0164173
Nov. 29, 2018 (KR) .......................... 10-2018-0150840

(51) Int. Cl.
*G06F 7/57* (2006.01)
*G06N 3/06* (2006.01)
*G06N 3/063* (2006.01)
*G06N 3/04* (2006.01)

(52) U.S. Cl.
CPC .............. *G06N 3/063* (2013.01); *G06F 7/57* (2013.01); *G06N 3/04* (2013.01); *G06F 2207/4824* (2013.01)

(58) Field of Classification Search
CPC ........... G06F 7/5443; G06F 7/57; G06F 7/575
See application file for complete search history.

(56) References Cited

U.S. PATENT DOCUMENTS

| | | | |
|---|---|---|---|
| 5,091,864 A | 2/1992 | Baji et al. | |
| 5,633,989 A | 5/1997 | Shin et al. | |
| 2011/0213743 A1 | 9/2011 | Choi et al. | |
| 2017/0103318 A1 | 4/2017 | Ross et al. | |
| 2017/0115958 A1* | 4/2017 | Langhammer | ........ G06F 7/5443 |
| 2018/0032859 A1 | 2/2018 | Park et al. | |
| 2018/0088908 A1* | 3/2018 | Vincenzoni | ........... G06F 7/5443 |
| 2018/0267776 A1* | 9/2018 | Ukai | ..................... G06F 7/5443 |

FOREIGN PATENT DOCUMENTS

| | | |
|---|---|---|
| KR | 10-2018-0012439 A | 2/2018 |
| WO | 2016186801 A1 | 11/2016 |

\* cited by examiner

*Primary Examiner* — Chuong D Ngo

(57) ABSTRACT

A processing element and an operating method thereof in a neural network are disclosed. The processing element may include a first multiplexer selecting one of a first value stored in a first memory and a second value stored in a second memory, a second multiplexer selecting one of a first data input signal and an output value of the first multiplexer, a third multiplexer selecting one of the output value of the first multiplexer and a second data input signal, a multiplier multiplying an output value of the second multiplexer by an output value of the third multiplexer, a fourth multiplexer for selecting one of the output value of the second multiplexer and an output value of the multiplier, and a third memory storing an output value of the fourth multiplexer.

20 Claims, 11 Drawing Sheets

PROCESSING ELEMENT AND OPERATING METHOD THEREOF IN NEURAL NETWORK

CROSS-REFERENCE TO RELATED APPLICATIONS

This application claims priority to and the benefit of Korean Patent Application Nos. 10-2017-0164173 and 10-2018-0150840 filed in the Korean Intellectual Property Office on Dec. 1, 2017, and Nov. 29, 2018, respectively, the entire contents of which are incorporated herein by reference.

BACKGROUND OF THE INVENTION

(a) Field of the Invention

The present invention relates to a processing element and a method thereof in a neural network.

(b) Description of the Related Art

A neural network is used in a variety of applications that require intelligence and judgment similar to those of human beings, through training. In recent years, the potential of neural networks has become widely known through AlphaGo, IMAGE NET, etc., and researches on neural network algorithms and structures are being actively carried out to enhance the performance of artificial intelligence.

The basic idea of neural network is to imitate a structure, computation, and operating principal of the human brain. The human brain is a massively parallel neural network that performs differently from the way the Von Neumann central processing unit (CPU) of an existing computer performs a serial operation through instructions.

The operation of the neural network mainly uses a GPGPU (General-Purpose Computing on Graphics Processing Unit) and has better performance than the CPU. Recently, a convolutional neural network (CNN) has been widely used in various applications such as image recognition.

Since the GPGPU is designed for graphics operation, it is not an architecture that is specialized for neural network operation, and it is a burden to an operator because of high power consumption.

SUMMARY OF THE INVENTION

The present invention provides a processing element that is suitable for operation of a neural network.

According to an exemplary embodiment of the present invention, a processing element in a neural network is provided. The processing element may include a first multiplexer selecting one of a first value stored in a first memory and a second value stored in a second memory, a second multiplexer selecting one of a first data input signal and an output value of the first multiplexer, a third multiplexer selecting one of the output value of the first multiplexer and a second data input signal, a multiplier multiplying an output value of the second multiplexer by an output value of the third multiplexer, a fourth multiplexer for selecting one of the output value of the second multiplexer and an output value of the multiplier, and a third memory storing an output value of the fourth multiplexer.

The processing element may further include a fifth multiplexer selecting one of the first value, the second value, and a third value stored in the third memory, and a sixth multiplexer for selecting one of the first value, the second value, and the second data input signal.

The processing element may further include an adder/maximum value calculator adding or obtaining a maximum value of an output value of the fifth multiplexer and an output value of the sixth multiplexer or for obtaining the maximum value, and an output value of the adder/maximum value calculator may be stored in one of the first memory and the second memory.

The processing element may further include a seventh multiplexer for selecting one of the addition value, the maximum value, and the third value, and a demultiplexer storing an output value of the seventh multiplexer in one of the first memory and the second memory.

The processing element may further include an eighth multiplexer selecting one of the first value and the second value and outputting the selected one to a processing element neighboring the processing element.

The processing element may further include a comparator comparing the output value of the first multiplexer with a predetermined reference value and outputting the comparison result value to the fourth multiplexer.

The fourth multiplexer may select and output one of the output value of the second multiplexer and the output value of the multiplier according to the comparison result value.

The second multiplexer may output the first data input signal and the third multiplexer outputs the second data input signal, the multiplier may output a third value which is a value obtained by multiplying the first data input signal by the second data input signal, and the third value is stored in the first memory.

The multiplier may output a fourth value which is a value obtained by multiplying the first data input signal by the second data input signal, the fifth multiplexer may output the fourth value and the sixth multiplexer outputs the third value, the adder/maximum value calculator may output a fifth value that is a sum of the fourth value and the third value, and the fifth value may be newly stored in the first memory.

The fifth multiplexer may output the first value, the sixth multiplexer may output the second data input signal, the adder/maximum value calculator may output a third value that is a sum of the first value and the second data input signal, and the third value may be newly stored in the first memory.

The first multiplexer may output the first value, the second multiplexer may output the first value, the third multiplexer may select and output the second data input signal, the multiplier may output a third value which is a value obtained by multiplying the first value by the second data input signal, and the third value may be newly stored in the first memory.

The first multiplexer may output the first value, the second multiplexer may output the first value, the third multiplexer outputs the second data input signal, which is a value of 0, the multiplier may output a value of 0, which is a value obtained by multiplying the first value by 0, the fourth multiplexer may output the first value when the first value is greater than 0 and outputs 0 when the first value is less than the first value, the fifth multiplexer may output the output value of the fourth multiplexer, the sixth multiplexer may output the second value, the adder/maximum value calculator may output a third value which is a larger value among the output value of the fourth multiplexer and the second value, and the third value may be newly stored in the first memory.

The first data input signal may be input to the adder/maximum value calculator through the fifth multiplexer, the second value may be input to the adder/maximum value calculator through the sixth multiplexer, the adder/maximum value calculator may output a third value which is a larger value among the first data input signal and the second value, and the third value may be transferred to a processing element neighboring the processing element.

The first memory, the second memory, and the third memory may be registers.

According to another exemplary embodiment of the present invention, a processing element performing operations in a neural network is disclosed. The processing element may include a first multiplexer selecting a first value among the first value stored in a first memory and a first data input signal, a second multiplexer selecting a second data input signal among the first value and the second data input signal, a multiplier multiplying the first value by an output value of the second multiplexer, a comparator comparing the first value with a predetermined reference value, and a third multiplexer selecting one of an output value of the first multiplexer and an output value of the multiplier according to the comparison result of the comparator.

The processing element may further include a maximum value calculator obtaining a larger one of an output value of the third multiplexer and a second value stored in a second memory, and an output value of the maximum value calculator may be newly stored in the first memory.

The reference value may be 0 and the second data input signal may be 0.

According to another exemplary embodiment of the present invention, a method of operating a processing element in a neural network is disclosed. The method may include selecting, by a first multiplexer, a first data input signal among a first value stored in a first register and the first data input signal, selecting, by a second multiplexer, a second data input signal among the first value and the second data input signal, generating a second value that is a value obtained by multiplying the first data input signal by the second data input signal, and storing the second value in the first register.

The method may further include generating a third value that is a value obtained by multiplying the first data input signal by the second data input signal, generating a fifth value that is a value obtained by adding the third value and the fourth value, and storing the fifth value in the first register.

The first data input signal and the second data input signal may be data input from processing elements neighboring the processing element.

The processing element according to an exemplary embodiment of the present invention may perform various neural network operations.

DETAILED DESCRIPTION OF THE EMBODIMENTS

Figure 1:
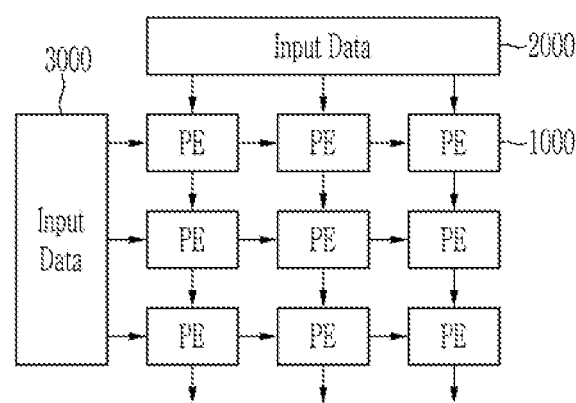
FIG. 1 is a diagram showing a systolic array according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout this specification and the claims that follow, when it is described that an element is "coupled" to another element, the element may be "directly coupled" to the other element or "electrically coupled" to the other element through a third element. In addition, unless explicitly described to the contrary, the word "comprise" and variations such as "comprises" or "comprising" will be understood to imply the inclusion of stated elements, but not the exclusion of any other elements.

FIG. 1 is a diagram showing a systolic array according to an exemplary embodiment of the present invention. More specifically, FIG. 1 is a diagram showing a systolic array used in a convolutional neural network (CNN) operation.

As shown in FIG. 1, the systolic array includes a plurality of processing elements (PEs) 1000, and the plurality of PEs 1000 are connected in an array form. The plurality of PEs 1000 are connected in an array form to exchange data between neighboring PEs and perform operations. Input data 2000 may have a predetermined value before a convolution operation as a weight value, and input data 3000 may have an audio or image value for operation.

In the systolic array, data reuse is performed through data transfer between the PEs 1000, thereby minimizing redundant memory access. A flush method in which data shifting and data output are periodically performed can be used. Meanwhile, an input/output data transfer direction of the systolic array and a data transfer direction between the PEs can be determined according to a data input/output scheme of the algorithm to be computed.

Figure 2:
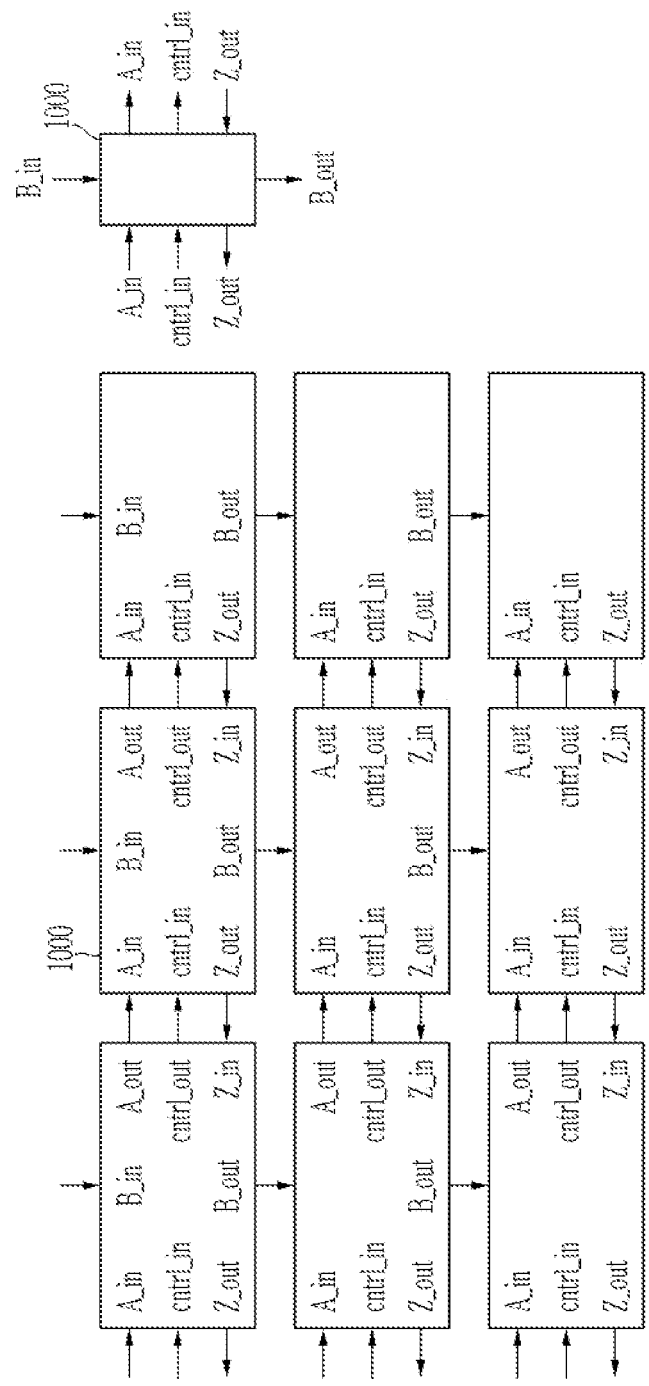
FIG. 2 is a diagram showing signals transmitted between a plurality of PEs according to an exemplary embodiment of the present invention.

FIG. 2 is a diagram showing signals transmitted between a plurality of PEs 1000 according to an exemplary embodiment of the present invention.

Each PE 1000 receives a first data input signal A_in, a second data input signal B_in, and a third data input signal Z_in. The first data input signal A_in is a data signal input from the left PE or the input data 3000, and the second data input signal B_in is a data signal input from the upper PE or the input data 2000. The third data input signal Z_in is a data signal input from the right PE.

Each PE 1000 outputs a first data output signal A_out, a second data output signal B_out, and a third data output signal Z_out. The first data output signal A_out is a data signal output to the right PE and the second data output signal B_out is a data signal output to the lower PE. The third data output signal Z_out is a data signal output to the left PE.

Each PE 1000 receives a control input signal (Cntrl_in) from a control unit (not shown) or the left PE, and outputs a control output signal (Cntrl_out) to the right PE.

Figure 3:
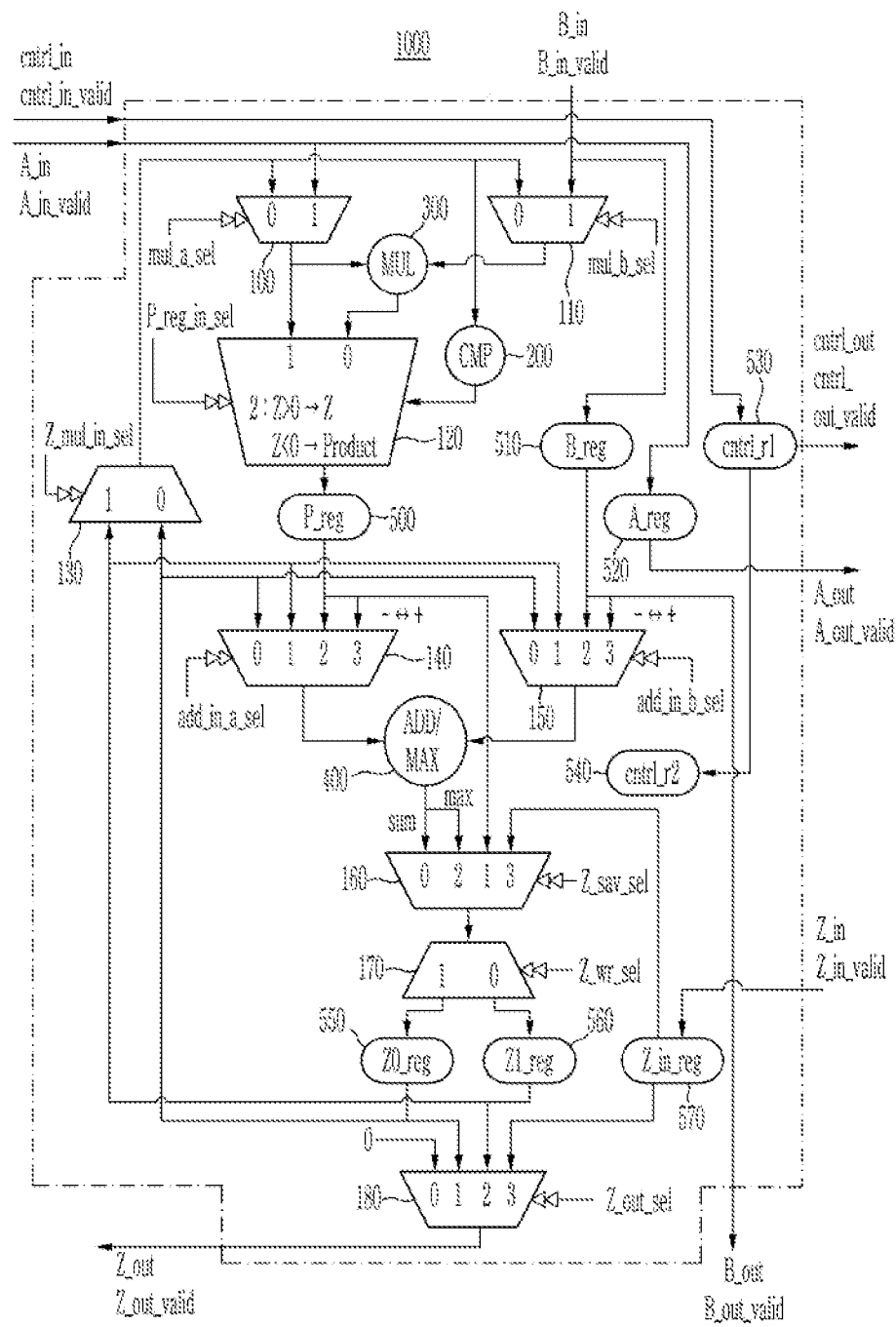
FIG. 3 is a diagram showing an internal circuit configuration of a PE according to an exemplary embodiment of the present invention.

FIG. 3 is a diagram showing an internal circuit configuration of a PE 1000 according to an exemplary embodiment of the present invention.

As shown in FIG. 3, the PE 1000 according to an exemplary embodiment of the present invention includes a plurality of multiplexers 100, 110, 120, 130, 140, 150, 160, and 180, a demultiplexer 170, a comparator 200, a multiplier 300, an adder/maximum value calculator 400, and a plurality of registers 500, 510, 520, 530, 540, 550, 560, and 570. In the exemplary embodiment of the present invention, as an element for storing data, a register is described for convenience, but another memory element can be used.

The plurality of multiplexers 100, 110, 120, 130, 140, 150, 160, and 180 and the demultiplexer 170 are controlled through control signals. A following Table 1 shows control signals of the multiplexers 100, 110, 120, 130, 140, 150, 160, and 180 and the demultiplexer 170 for performing the CNN operation and the operating method thereof. The control signal in Table 1 may be provided by a separate control unit (not shown).

output values of the multiplexer 130 and the first data input signal A_in for the multiplication operation of the multiplier 300, and outputs the selected value to the multiplier 300. The multiplexer 110 is controlled by a control signal mul_b_sel, and selects one of the multiplexer 130 output and the second data input signal B_in for operation of the multiplier 300 and outputs the selected value to the multiplier 300.

The multiplexer 130 is controlled by a control signal z_mul_in_sel, and selects one of the value of the register Z0_reg 550 and the value of the register Z1_reg 560 for the multiplication operation of the multiplier 300 and outputs the selected value to the multiplexer 100.

The multiplexer 120 is controlled by a control signal P_reg_in_sel, and outputs one of an output value of the multiplier 300, an output value of the multiplexer 100, and an output of the comparator 200 in order to store data in the register P_reg 500, and outputs the selected value to the register 500.

The comparator 200 compares the output of the multiplexer 130 (i.e., the value stored in the register 550 or the register 560) with a predetermined reference value (e.g., 0), and outputs information to the multiplexer 120 as to whether the output of the multiplexer 130 is greater or less than the reference value. Referring to Table 1, when the control signal P_reg_in_sel of the multiplexer 120 is set to 2 (i.e., binary 10) and the output of the multiplexer 130 is larger than the reference value 0, the multiplexer 120 selects and outputs the output value of the multiplexer 100. When the control signal P_reg_in_sel of the multiplexer 120 is set to 2 and the output of the multiplexer 130 is smaller than the reference value 0, the multiplexer 120 selects and outputs the output value of the multiplier 300.

The multiplexer 140 is controlled by a control signal add_in_a_sel, and selects one of the values of the plurality of registers 550, 560, and 500 for operation of the adder/

TABLE 1

| Control Signal | Cntrl bit | Result | | Description |
|---|---|---|---|---|
| mul_a_sel | [14] | 0 | mul_a = mul_Z | Operand for Mul |
|  |  | 1 | mul_a = A_in |  |
| mul_b_sel | [13] | 0 | mul_b = mul_Z | Operand for Mul |
|  |  | 1 | mul_b = B_in |  |
| Z_mul_in_sel | [12] | 0 | mul_a_Z = Z0_reg | Z operand select |
|  |  | 1 | mul_a_Z = Z1_reg |  |
| P_reg_in_sel | [11:10] | 00 | P_reg = mul_out (product) | P reg select |
|  |  | 01 | P_reg = A_in (mul bypass) |  |
|  |  | 10 | Z_reg > 0:P_reg = mul_a (bypass mul) |  |
|  |  |  | Z_reg < 0:P_reg = mul_out (product) |  |
| add_in_a_sel | [9:8] | 00 | add_a = Z0_reg | Operand for Add/Max |
|  |  | 01 | add_a = Z1_reg |  |
|  |  | 10 | add_a = P_reg |  |
|  |  | 11 | sub_a = −P_reg |  |
| add_in_b_sel | [7:6] | 00 | add_b = Z0_reg | Operand for Add/Max |
|  |  | 01 | add_b = Z1_reg |  |
|  |  | 10 | add_b = B_reg |  |
|  |  | 11 | sub_b = −B_reg |  |
| Z_save_sel | [5:4] | 00 | Z_sav = add_out | Z reg input select |
|  |  | 01 | Z_sav = P_reg (bypass adder) |  |
|  |  | 10 | Z_sav = max_out |  |
|  |  | 11 | Z_save = Z_in |  |
| Z_wr_sel | [3:2] | 00 | Z0_reg = Z_sav | Z reg select |
|  |  | 01 | Z1_reg = Z_sav |  |
|  |  | 10 | Noop |  |
| Z_out_sel | [1:0] | 00 | Z_out = 0 (valid = 0) | Z reg output select |
|  |  | 01 | Z_out = Z0_reg (valid) |  |
|  |  | 10 | Z_out = Z1_reg (valid) |  |
|  |  | 11 | Z_out = Z_in (valid if Z_in_valid) |  |

Referring to FIG. 3 and Table 1, the multiplexer 100 is controlled by a control signal mul_a_sel, selects one of the maximum value calculator 400, and outputs the selected value to the adder/maximum value calculator 400. Here, when the control signal add_in_a_sel is set to 2, the multiplexer 140 selects and outputs the value of the register 500. When the control signal add_in_a_sel is set to 3, the multiplexer 140 takes a negative value (−P_reg) for the value of the register 500 and outputs it.

The multiplexer 150 is controlled by a control signal add_in_b_sel, selects one of the values of the plurality of registers 550, 560, and 510 for operation of the adder/maximum value calculator 400, and outputs the selected value to the the adder/maximum value calculator 400. Here, when the control signal add_in_b_sel is set to 2, the multiplexer 150 selects and outputs the value of the register 510. When the control signal add_in_b_sel is set to 3, the multiplexer 150 takes a negative value (−B_reg) for the value of the register 510 and outputs it.

The adder/maximum value calculator 400 then performs an addition calculation or a maximum value calculation to output the addition (sum) value or a maximum value. The adder/maximum value calculator 400 adds the output value of the multiplexer 140 and the output value of the multiplexer 150, and outputs the sum value to the multiplexer 160. The adder/maximum value calculator 400 takes a larger value among the output value of the multiplexer 140 and the output value of the multiplexer 150, and outputs the larger value (i.e., maximum value) to the multiplexer 160.

The multiplexer 160 is controlled by a control signal z_sav_sel, and selects one of the output values (sum and max) of the adder/maximum value calculator 400, the value of the register 500, and the value of the register 570, and outputs the selected value to a demultiplexer 170.

The demultiplexer 170 is controlled by a control signal z_wr_sel, and stores the output value of the multiplexer 160 in the register 550 or the register 560.

The multiplexer 180 is controlled by a control signal z_out_sel, and selects one of 0, the value of the register 550, the value of register 560, and the value of the register 570, and then outputs the selected value as the third data output signal Z_out.

The PE 1000 according to the exemplary embodiment of the present invention shown in FIG. 3 is programmable through control of a plurality of multiplexers and can efficiently perform various data flow schemes, operations, algorithms, and the like. The control signal, the data input signal, the data output signal, and the like shown in FIGS. 2 and 3 are transmitted every cycle, and the actual operation may take 2 cycles.

Hereinafter, the operating method of the PE 1000 in the CNN operation will now be described with reference to FIG. 4 to FIG. 10.

The operations used in the CNN operation are as follows: i) convolution operation; ii) normalization and bias operation; iii) normalization operation; iv) ReLU (rectified linear unit) function and max pooling operation; v) max pooling operation and a data flush; and vi) output data transfer.

First, a convolution operation will be described with reference to FIGS. 4A and 4B. The convolution operation consists of a multiplication operation and an addition operation.

Figure 4A:
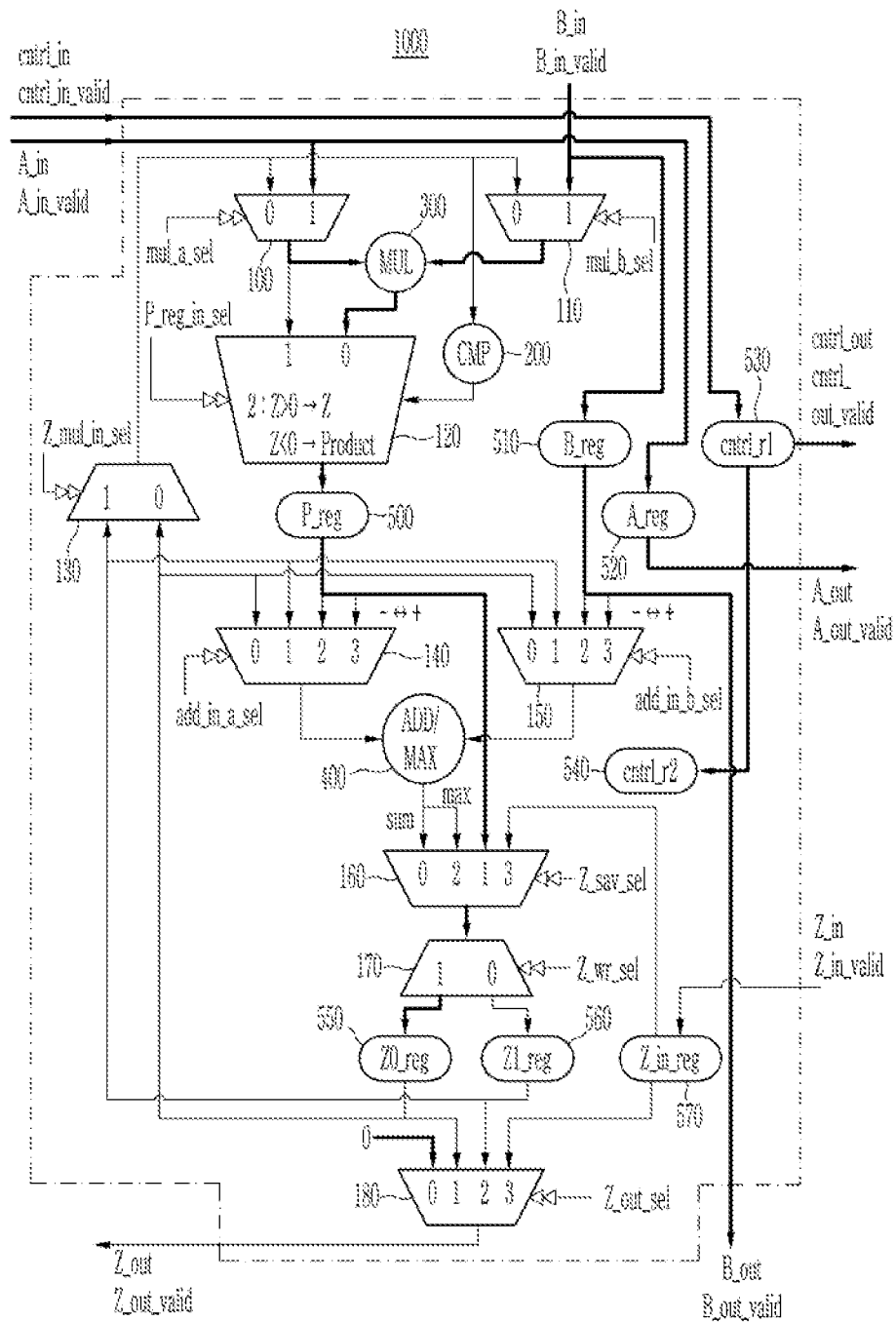
FIG. 4A is a diagram showing a multiplication operation of a PE according to an exemplary embodiment of the present invention.

FIG. 4A is a diagram showing a multiplication operation of the PE 1000 according to an exemplary embodiment of the present invention. The portion denoted in bold in FIG. 4A represents a signal flow during the multiplication operation.

Referring to FIG. 4A, the multiplexer 100 outputs the first data input signal A_in, and the multiplexer 110 outputs the second data input signal B_in. The multiplier 300 multiplies the first data input signal A_in by the second data input signal B_in, and the multiplied value is stored in the register 500 through the multiplexer 120. The values stored in the register 500 are stored in the register 550 through the multiplexer 160 and the demultiplexer 170.

Meanwhile, the first data input signal A_in is stored in the register 520, and the value stored in the register 520 is output as the first data output signal A_out. The second data input signal B_in is stored in the register 510, and the value stored in the register 510 is output to the second data output signal B_out.

A control input signal cntrl_in is stored in the register 530, and the value stored in the register 530 is output to a control output signal cntrl_out. The value stored in the register 530 is stored in the register 540.

Figure 4B:
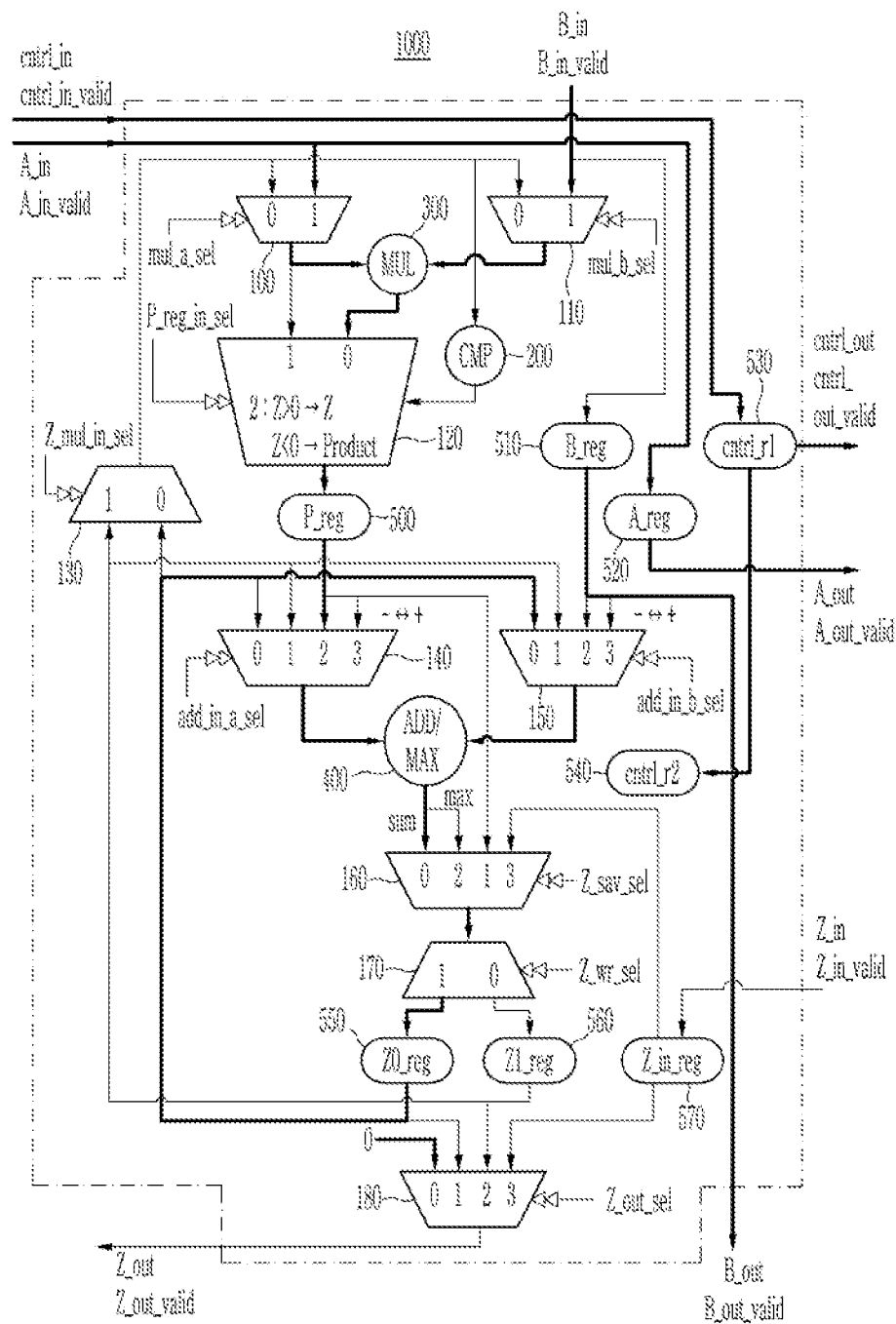
FIG. 4B is a diagram showing a multiplication and addition operation of a PE according to an exemplary embodiment of the present invention.

FIG. 4B is a diagram showing a multiplication and addition operation of the PE 1000 according to an exemplary embodiment of the present invention. The portion denoted in bold in FIG. 4B represents a signal flow during the multiplication and addition operation.

Referring to FIG. 4B, the operating method in the multiplication operation is the same as that described in FIG. 4A. That is, the multiplier 300 multiplies the first data input signal A_in by the second data input signal B_in, and the multiplied value is stored in the register 500.

The multiplexer 140 outputs the value stored in the register 500 to the adder/maximum value calculator 400, and the multiplexer 150 outputs the value stored in the register 550 to the adder/maximum value calculator 400.

The adder/maximum value calculator 400 adds the two input values, and the sum value is newly stored in the register 550 through the multiplexer 160 and the demultiplexer 170. That is, the value stored in the register 550 is replaced with the value calculated through the operating method of FIG. 4B from the value calculated through the operating method of FIG. 4A.

Figure 5:
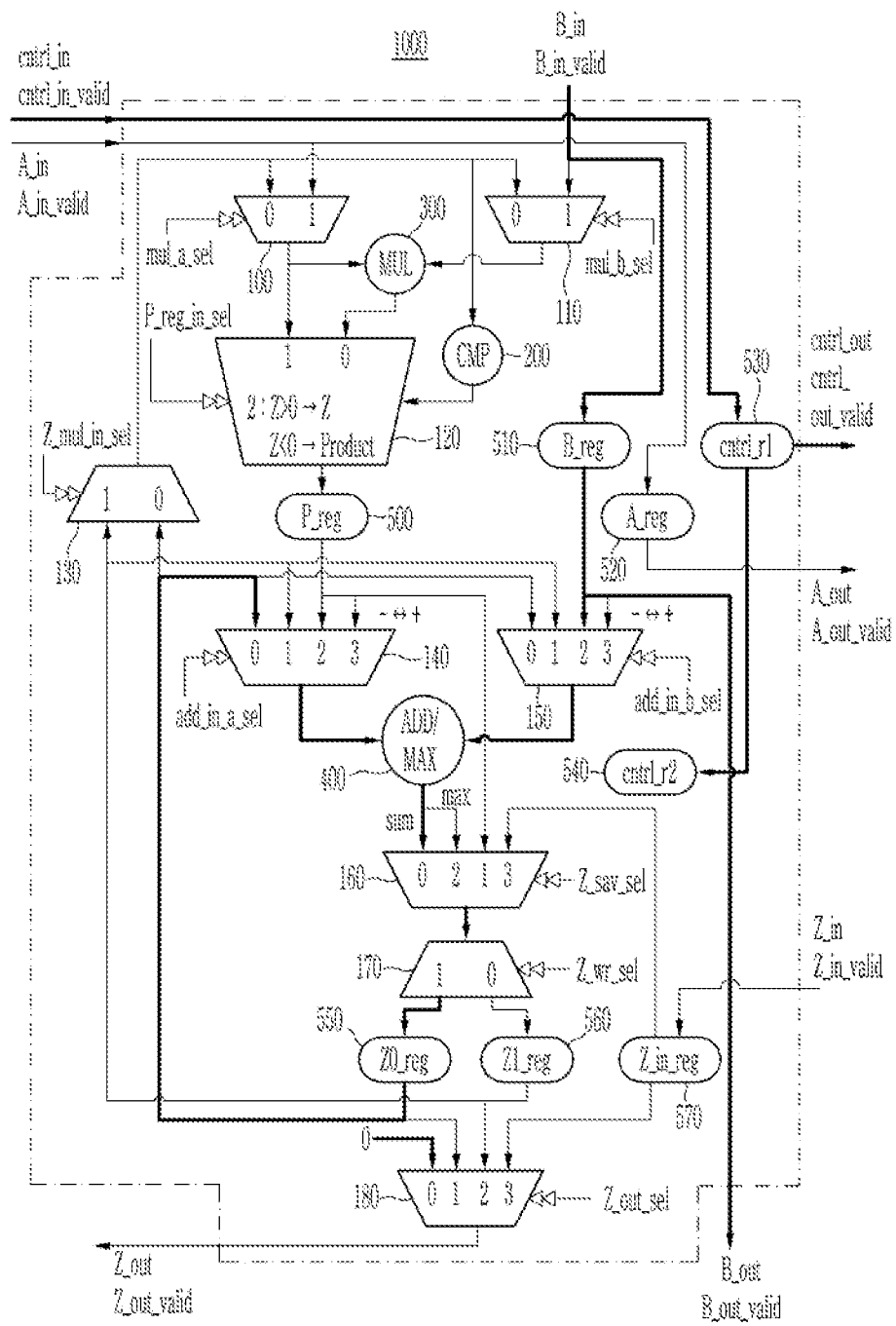
FIG. 5 is a diagram showing a normalization and bias calculation operation of a PE according to an exemplary embodiment of the present invention.

Referring to FIG. 5, the normalization and bias operation will be described. The normalization and bias operation may be implemented through addition operations.

FIG. 5 is a diagram showing the normalization and bias operation of the PE 1000 according to an exemplary embodiment of the present invention. The portion denoted in bold in FIG. 5 represents a signal flow during the normalization and bias operation.

Referring to FIG. 5, the second data input signal B_in is input to the adder/maximum value calculator 400 through the register 510 and the multiplexer 150. The value stored in the register 550 is input to the adder/maximum value calculator 400 through the multiplexer 140.

The adder/maximum value calculator 400 adds the two input values, and the sum value is newly stored in the register 550 through the multiplexer 160 and the demultiplexer 170.

The control input signal cntrl_in is stored in the register 530, and the value stored in the register 530 is output as the control output signal cntrl_out. The value stored in the register 530 is stored in the register 540.

Figure 6:
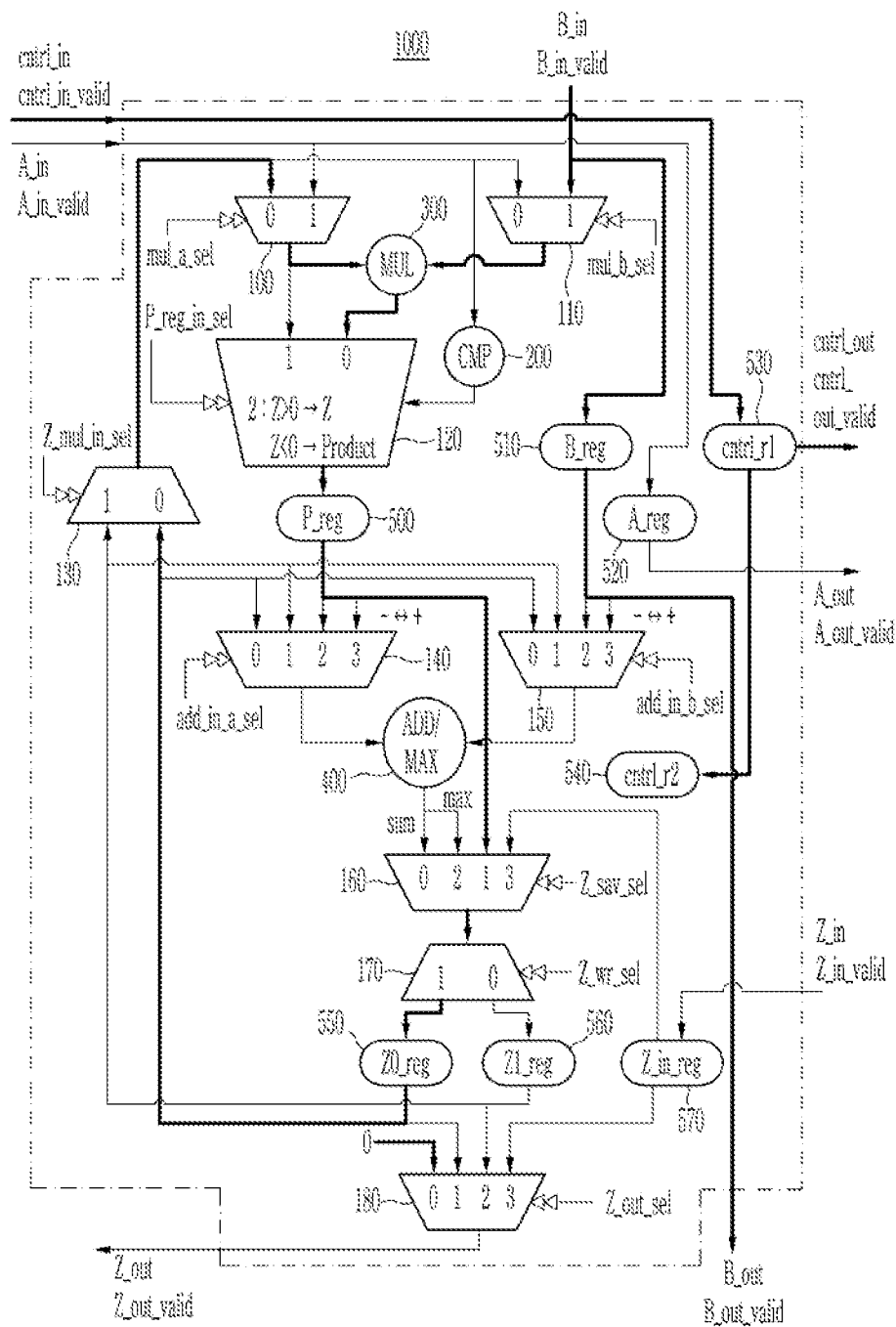
FIG. 6 is a diagram showing the normalization operation of a PE according to an exemplary embodiment of the present invention.

Referring to FIG. 6, the normalization operation will be described. The normalization operation may be implemented through a multiplication operation.

FIG. 6 is a diagram showing the normalization operation of the PE 1000 according to an exemplary embodiment of the present invention. The portion denoted in bold in FIG. 6 represents a signal flow during the normalization and bias operation.

Referring to FIG. 6, the second data input signal B_in is input to the multiplier 300 through the multiplexer 110. The value stored in the register 550 is input to the multiplier 300 through the multiplexer 130 and the multiplexer 100.

The multiplier 300 multiplies the two input values, and the multiplied value is stored in the register 500 through the multiplexer 120. The values stored in the register 500 are newly stored in the register 550 through the multiplexer 160 and the demultiplexer 170.

Meanwhile, the second data input signal B_in is stored in the register 510, and the value stored in the register 510 is output as the second data output signal B_out. The control input signal cntrl_in is stored in the register 530, and the value stored in the register 530 is output as the control output signal cntrl_out. The value stored in the register 530 is stored in the register 540.

Figure 7:
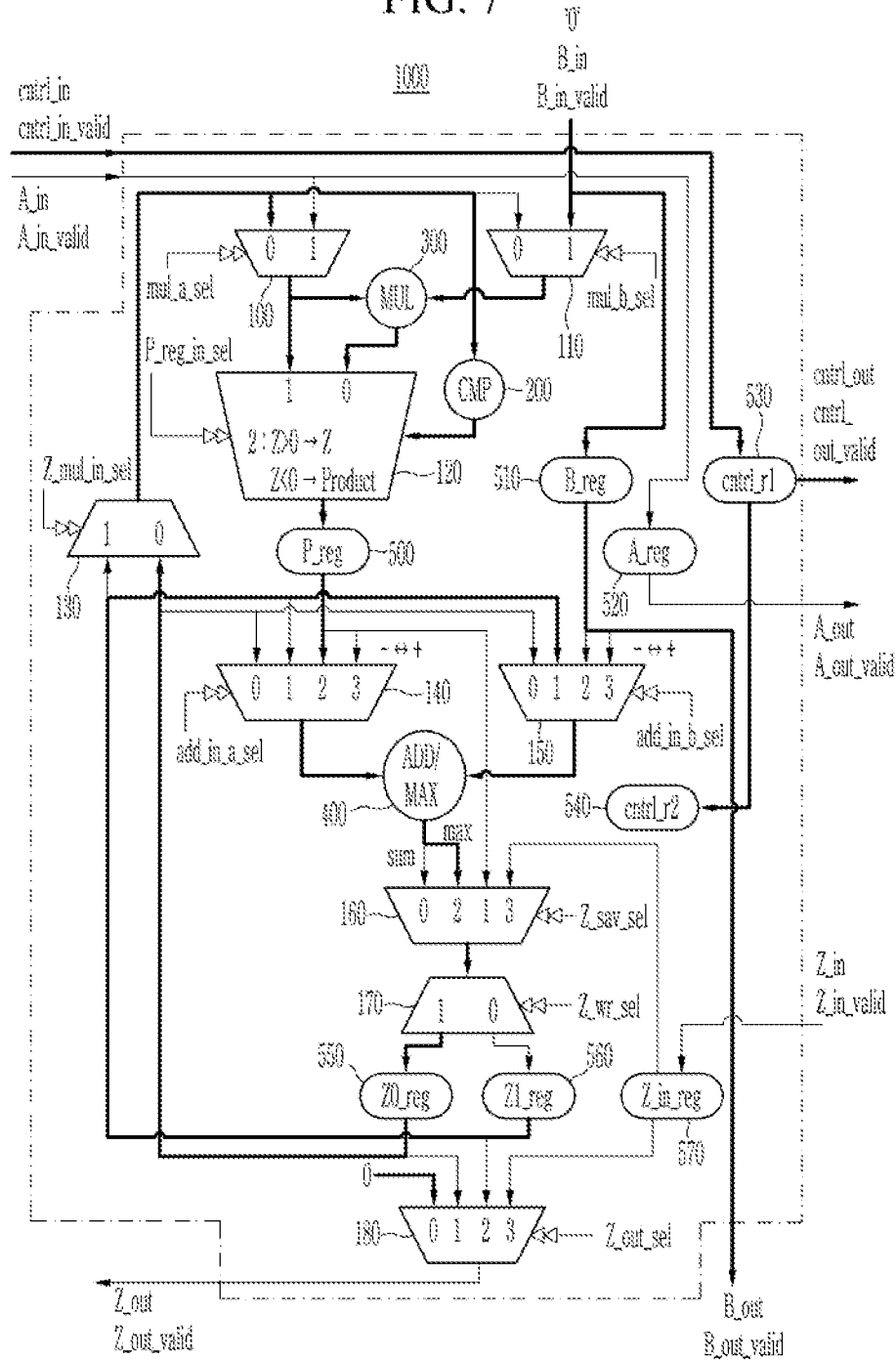
FIG. 7 is a diagram showing a ReLU function and a max pooling operation of a PE according to an exemplary embodiment of the present invention.

Referring to FIG. 7, the ReLU function and max pooling operation will be described. The ReLU function is expressed by the following Equation 1.

$$R(z)=\max(0, z) \quad \text{(Equation 1)}$$

Figure 8:
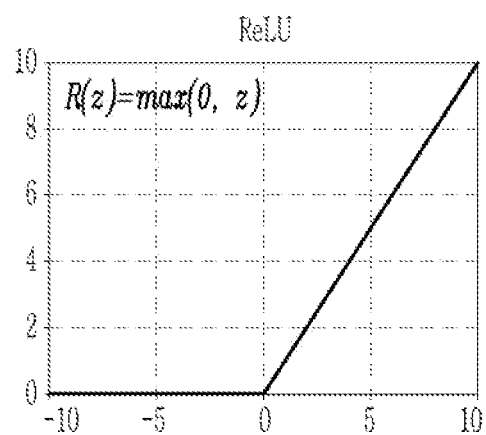
FIG. 8 is a graph showing a ReLU function.

FIG. 8 is a graph showing the ReLU function. As shown in FIG. 8, the ReLU function fixes the output to '0' for a negative input z.

FIG. 7 is a diagram showing the ReLU function and max pooling operation of the PE 1000 according to an exemplary embodiment of the present invention. The portion denoted in bold in FIG. 7 represents a signal flow during the ReLU function and max pooling operation.

In FIG. 7, it is assumed that the register 560 stores the already calculated value in advance.

Referring to FIG. 7, the second data input signal B_in has a value of '0'. The second data input signal B_in having a value of 0 is input to the multiplier 300 through the multiplexer 110. The value Z0 stored in the register 550 is input to the comparator 200 through the multiplexer 130, and the value Z0 stored in the register 550 is input to the multiplier 300 and the multiplexer 120 through the multiplexer 130 and the multiplexer 100.

The comparator 200 compares the input value (i.e., the value Z0 stored in the register 550) with the reference value (0), and outputs information to the multiplexer 120 as to whether the value input value Z0 is greater or smaller than the reference value 0. The multiplier 300 multiplies the input two signals and outputs the multiplied value (i.e., 0) to the multiplexer 120.

If Z0>0, the multiplexer 120 outputs the output signal (i.e., Z0) of the multiplexer 100. If Z0>0, the multiplexer 120 outputs the output signal (i.e., 0) of the multiplexer 100. The output value of the multiplexer 120 is stored in the register 500, and the value stored in the register 500 is input to the adder/maximum value calculator 400 through the multiplexer 140. Meanwhile, the value previously stored in the register 560 is input to the adder/maximum value calculator 400 through the multiplexer 150.

The adder/maximum value calculator 400 outputs a larger value (max) among the output value of the multiplexer 140 and the output value of the multiplexer 150, and this value is newly stored in the register 550 through the multiplexer 160 and the demultiplexer 170.

Figure 9:
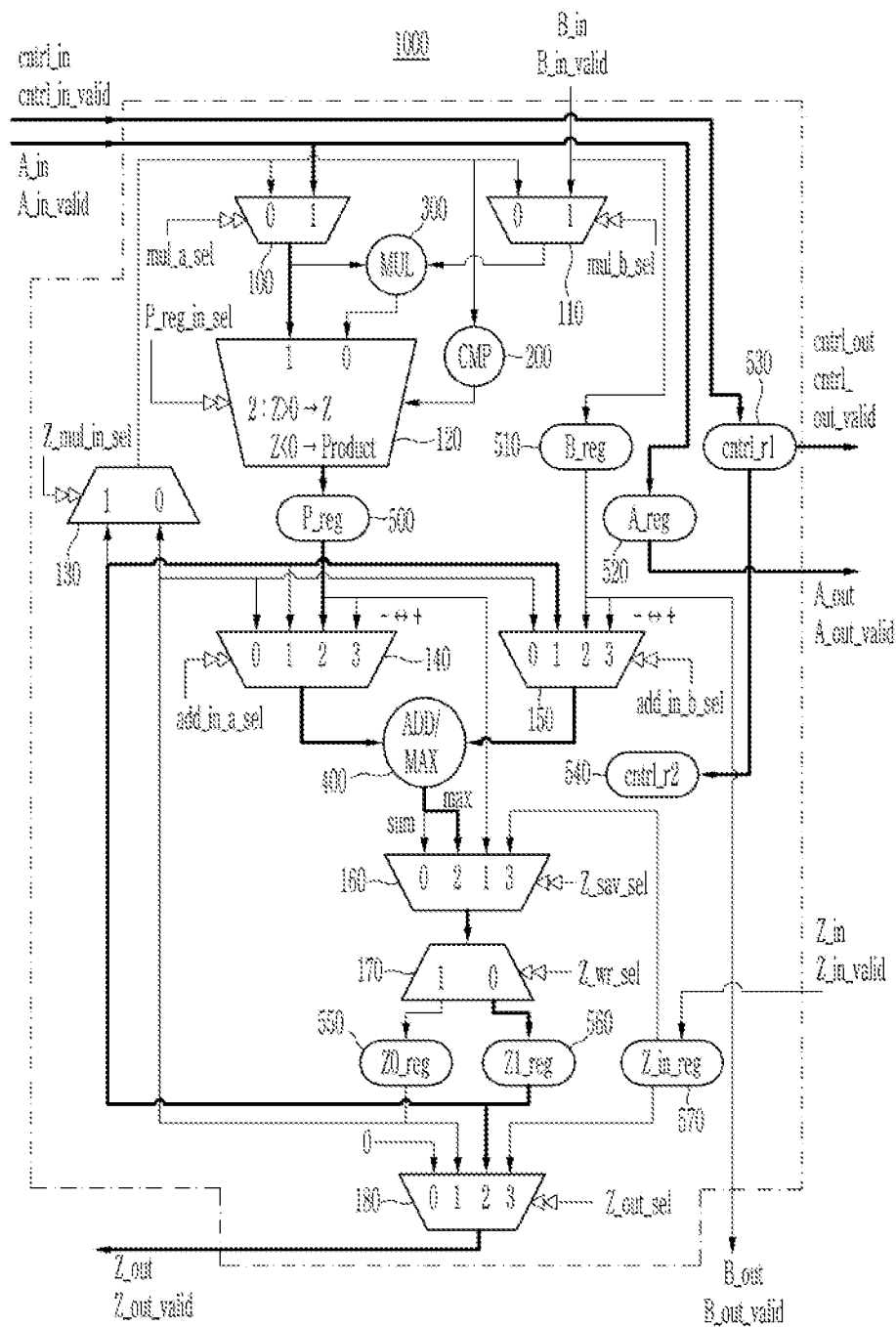
FIG. 9 is a diagram showing a max pooling operation and a data flush of a PE according to an exemplary embodiment of the present invention

Referring to FIG. 9, the max-pool operation and data flushing will be described.

FIG. 9 is a diagram showing the max-pool operation and data flushing of the PE 1000 according to an exemplary embodiment of the present invention. The portion denoted in bold in FIG. 9 represents a signal flow during the max-pool operation and data flushing.

In FIG. 9, it is assumed that the already calculated value Z1 is stored in the register 560 in advance.

The first data input signal A_in is input to the adder/maximum value calculator 400 through the multiplexer 100, the multiplexer 120, the register 500, and the multiplexer 140. The value Z1 stored in the register 560 is input to the adder/maximum value calculator 400 through the multiplexer 150.

The adder/maximum value calculator 400 outputs a larger value (max) among the output value of the multiplexer 140 and the output value of the multiplexer 150, and this value is newly stored in the register 560 through the multiplexer 160 and the demultiplexer 170. The value newly stored in the register 560 is output as the third data output signal Z_out through the multiplexer 180. Here, the third data output signal Z_out is data transmitted to the neighboring PE 1000.

Figure 10:
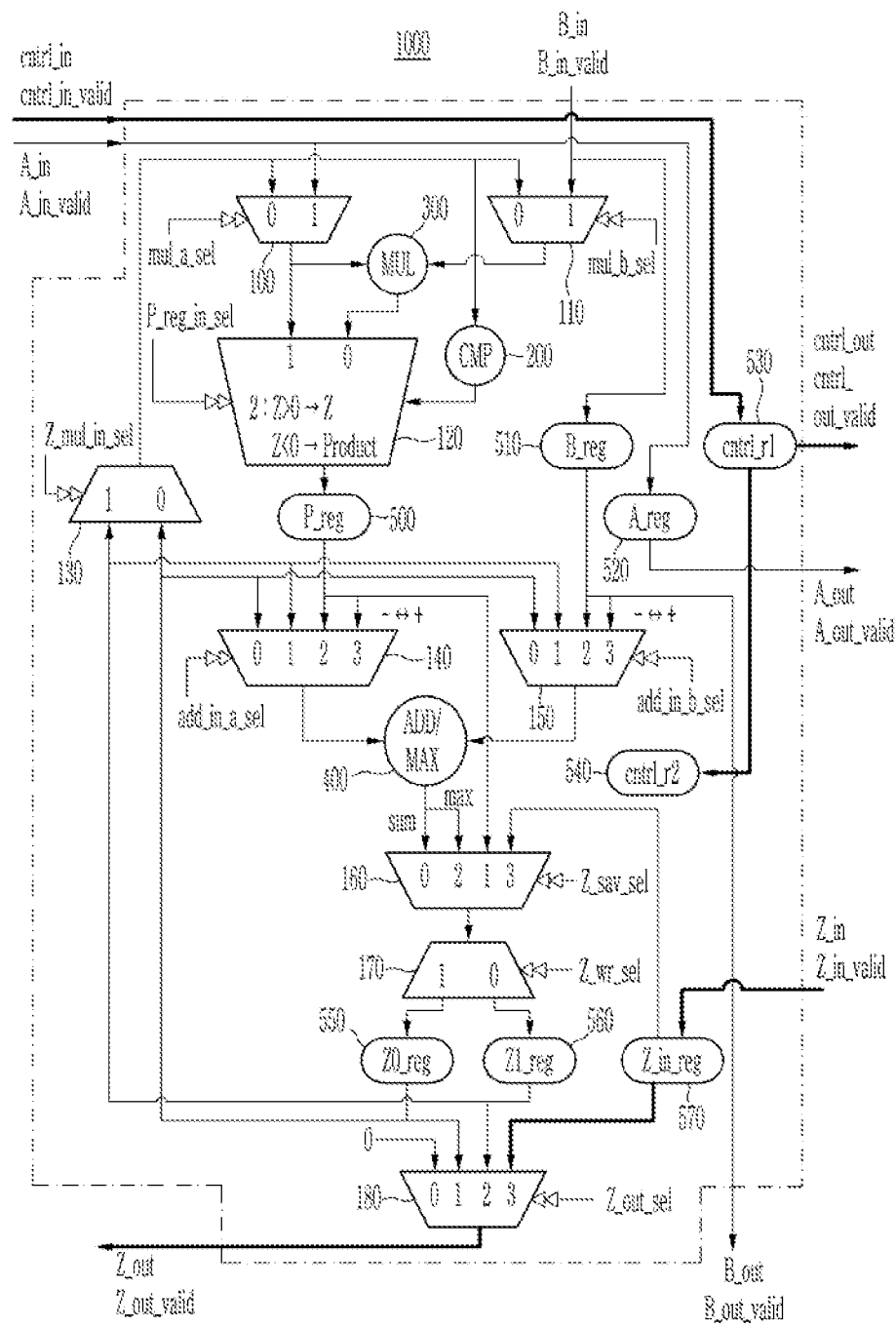
FIG. 10 is a diagram showing an output data transfer operation according to an exemplary embodiment of the present invention.

Referring to FIG. 10 the output data transfer operation will be described.

FIG. 10 is a diagram showing the output data transfer operation according to an exemplary embodiment of the present invention. The portion denoted in bold in FIG. 10 represents a signal flow during the output data transfer operation.

Referring FIG. 10, the third data input signal Z_in is stored in the register 570, and the value stored in the register 570 is output as the third data output signal Z_out through the multiplexer 180. Here, the third data output signal Z_out is data that is flushed out to the neighboring PE 1000.

As illustrated in FIGS. 4 to 10, the PE 1000 according to the exemplary embodiment of the present invention can perform a CNN operation. The PE 1000 according to the exemplary embodiment of the present invention can perform most of the types of operations required in the neural network by programming the control signals of the plurality of multiplexers. That is, the PE 1000 according to the exemplary embodiment of the present invention can perform an operation required for an LSTM (long short-term memory), which is a kind of a recurrent neural network. A specific method of performing operations required for the LSTM will be apparent to those skilled in the art through the PE 1000 illustrated in FIG. 3, and a detailed description thereof will be omitted. Meanwhile, the PE 1000 according to the exemplary embodiment of the present invention can be variously set according to an application. The PE 1000 according to the exemplary embodiment of the present invention solves the memory bandwidth bottleneck of the CNN through data reuse of a systolic design, thereby achieving a parallel operation for applying AI (artificial intelligence) and providing an efficient computing platform.

While this invention has been described in connection with what is presently considered to be a practical exemplary embodiment, it is to be understood that the invention is not limited to the disclosed embodiment, but, on the contrary, is intended to cover various modifications and equivalent arrangements included within the spirit and scope of the appended claims.

What is claimed is:
1. A processing element in a neural network, comprising:
a first multiplexer selecting one of a first value stored in a first memory and a second value stored in a second memory;
a second multiplexer selecting one of a first data input signal and an output value of the first multiplexer;
a third multiplexer selecting one of the output value of the first multiplexer and a second data input signal:
a multiplier multiplying an output value of the second multiplexer by an output value of the third multiplexer;

a fourth multiplexer for selecting one of the output value of the second multiplexer and an output value of the multiplier; and
a third memory storing an output value of the fourth multiplexer.

2. The processing element of claim 1, further comprising:
a fifth multiplexer selecting one of the first value, the second value, and a third value stored in the third memory; and
a sixth multiplexer for selecting one of the first value, the second value, and the second data input signal.

3. The processing element of claim 2, further comprising
an adder/maximum value calculator adding or obtaining a maximum value of an output value of the fifth multiplexer and an output value of the sixth multiplexer or for obtaining the maximum value,
wherein an output value of the adder/maximum value calculator is stored in one of the first memory and the second memory.

4. The processing element of claim 3, further comprising:
a seventh multiplexer for selecting one of the addition value, the maximum value, and the third value; and
a demultiplexer storing an output value of the seventh multiplexer in one of the first memory and the second memory.

5. The processing element of claim 4, further comprising
an eighth multiplexer selecting one of the first value and the second value and outputting the selected one to a processing element neighboring the processing element.

6. The processing element of claim 3, wherein
the second multiplexer outputs the first data input signal and the third multiplexer outputs the second data input signal,
the multiplier outputs a third value which is a value obtained by multiplying the first data input signal by the second data input signal, and
the third value is stored in the first memory.

7. The processing element of claim 6, wherein
the multiplier outputs a fourth value which is a value obtained by multiplying the first data input signal by the second data input signal.
the fifth multiplexer outputs the fourth value and the sixth multiplexer outputs the third value,
the adder/maximum value calculator outputs a fifth value that is a sum of the fourth value and the third value, and
the fifth value is newly stored in the first memory.

8. The processing element of claim 3, wherein
the fifth multiplexer outputs the first value, the sixth multiplexer outputs the second data input signal,
the adder/maximum value calculator outputs a third value that is a sum of the first value and the second data input signal, and
the third value is newly stored in the first memory.

9. The processing element of claim 3, wherein
the first multiplexer outputs the first value, the second multiplexer outputs the first value, the third multiplexer outputs the second data input signal, which is a value of 0,
the multiplier outputs a value of 0, which is a value obtained by multiplying the first value by 0,
the fourth multiplexer outputs the first value when the first value is greater than 0 and outputs 0 when the first value is less than the first value,
the fifth multiplexer outputs the output value of the fourth multiplexer, the sixth multiplexer outputs the second value,
the adder/maximum value calculator outputs a third value which is a larger value among the output value of the fourth multiplexer and the second value, and
the third value is newly stored in the first memory.

10. The processing element of claim 3, wherein
the first data input signal is input to the adder/maximum value calculator through the fifth multiplexer and the second value is input to the adder/maximum value calculator through the sixth multiplexer,
the adder/maximum value calculator outputs a third value which is a larger value among the first data input signal and the second value, and
the third value is transferred to a processing element neighboring the processing element.

11. The processing element of claim 2, wherein
the first multiplexer outputs the first value, the second multiplexer outputs the first value, and the third multiplexer selects and outputs the second data input signal,
the multiplier outputs a third value which is a value obtained by multiplying the first value by the second data input signal, and
the third value is newly stored in the first memory.

12. The processing eiement of claim 1, further comprising
a comparator comparing the output vaiue of the first muitipiexer with a predetermined reference value and outputting the comparison resuit vaiue to the fourth moitipiexer.

13. The processing element of claim 6, wherein
the fourth multiplexer selects and outputs one of the output value of the second multiplexer and the output value of the multiplier according to the comparison result value.

14. The processing element of claim 1,
the first memory, the second memory, and the third memory are registers.

15. A processing element performing operations in a neural network, comprising:
a first multiplexer selecting a first value among the first value stored in a first memory and a first data input signal;
a second multiplexer selecting a second data input signal among the first value and the second data input signal;
a multiplier multiplying the first value by an output value of the second multiplexer;
a comparator comparing the first value with a predetermined reference value; and
a third multiplexer selecting one of an output value of the first multiplexer and an output value of the multiplier according to the comparison result of the comparator.

16. The processing element of claim 15, further comprising
a maximum value calculator obtaining a larger one of an output value of the third multiplexer and a second value stored in a second memory,
wherein an output value of the maximum value calculator is newly stored in the first memory.

17. The processing element of claim 15, wherein
the reference value is 0 and the second data input signal is 0.

18. A method of operating a processing element in a neural network, comprising:
selecting, by a first multiplexer, a first data input signal among a first value stored in a first register and the first data input signal;

selecting, by a second multiplexer, a second data input signal among the first value and the second data input signal;

generating a second value that is a value obtained by multiplying the first data input signal by the second data input signal; and storing the second value in the first register.

19. The method of claim 18, further comprising:

generating a third value that is a value obtained by multiplying the first data input signal by the second data input signal;

generating a fifth value that is a value obtained by adding the third value and the fourth value; and storing the fifth value in the first register.

20. The method of claim 19, wherein the first data input signal and the second data input signal are data input from processing elements neighboring the processing element.

\* \* \* \* \*